US012603273B2

(12) United States Patent
Jung et al.

(10) Patent No.: US 12,603,273 B2
(45) Date of Patent: Apr. 14, 2026

(54) METHOD OF PREPARING POSITIVE ELECTRODE ACTIVE MATERIAL

(71) Applicant: LG Chem, Ltd., Seoul (KR)

(72) Inventors: Won Sig Jung, Daejeon (KR); Seung Beom Cho, Daejeon (KR); Sang Soon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1481 days.

(21) Appl. No.: 16/982,812

(22) PCT Filed: Mar. 20, 2019

(86) PCT No.: PCT/KR2019/003269
§ 371 (c)(1),
(2) Date: Sep. 21, 2020

(87) PCT Pub. No.: WO2019/198944
PCT Pub. Date: Oct. 17, 2019

(65) Prior Publication Data
US 2021/0028445 A1    Jan. 28, 2021

(30) Foreign Application Priority Data

Apr. 12, 2018    (KR) ........................ 10-2018-0042892

(51) Int. Cl.
| | |
|---|---|
| *H01M 4/36* | (2006.01) |
| *H01M 4/04* | (2006.01) |
| *H01M 4/131* | (2010.01) |
| *H01M 4/134* | (2010.01) |
| *H01M 4/1391* | (2010.01) |
| *H01M 4/1395* | (2010.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ......... *H01M 4/364* (2013.01); *H01M 4/0471* (2013.01); *H01M 4/131* (2013.01); *H01M 4/134* (2013.01); *H01M 4/1391* (2013.01); *H01M 4/1395* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/364; H01M 4/131; H01M 4/134; H01M 4/1391; H01M 4/1395; H01M 4/505; H01M 4/525; H01M 4/0471; H01M 10/0525; F27B 3/065; C01G 53/50
See application file for complete search history.

(56) References Cited

U.S. PATENT DOCUMENTS

| | | | |
|---|---|---|---|
| 2011/0250499 A1 | 10/2011 | Hiratsuka | |
| 2012/0319037 A1 | 12/2012 | Kawahashi et al. | |
| 2015/0380720 A1 | 12/2015 | Kim et al. | |
| 2016/0218358 A1 | 7/2016 | Sakai et al. | |
| 2017/0155147 A1 | 6/2017 | Nishimura et al. | |
| 2017/0253494 A1 | 9/2017 | Garella et al. | |
| 2018/0316004 A1* | 11/2018 | Tokoro | H01M 4/525 |
| 2021/0336260 A1* | 10/2021 | Toyama | H01M 4/485 |

FOREIGN PATENT DOCUMENTS

| | | | |
|---|---|---|---|
| CN | 103066275 A | 4/2013 |
| CN | 103794773 A | 5/2014 |
| CN | 106816587 A | 6/2017 |
| JP | 2000173599 A | 6/2000 |
| JP | 2001035492 A | 2/2001 |
| JP | 2014116161 A | 6/2014 |
| JP | 2015135800 A | 7/2015 |
| JP | 2016091626 A | 5/2016 |
| JP | 2016136464 A | 7/2016 |
| JP | 2017100892 A | 6/2017 |
| KR | 20050083869 A | 8/2005 |
| KR | 20140101915 A | 8/2014 |
| KR | 20150001857 A | 1/2015 |
| KR | 20150080376 A | 7/2015 |
| KR | 20170088848 A | 8/2017 |
| WO | 2010113512 A1 | 10/2010 |

OTHER PUBLICATIONS

English Translation of JP 2016-091626 (Year: 2014).*
Search Report from International Application No. PCT/KR2019/003269, mailed Jun. 24, 2019.
Search Report dated Apr. 25, 2022 from the Office Action for Chinese Application No. 201980020353.9 issued Apr. 29, 2022, 3 pages.

* cited by examiner

*Primary Examiner* — Stephen J Yanchuk
(74) *Attorney, Agent, or Firm* — Lerner David LLP

(57) ABSTRACT

A method of preparing a positive electrode active material that includes introducing a reaction mixture including a lithium source material and a nickel-manganese-cobalt precursor into a continuous firing furnace and subjecting the same to primary heat treatment, thereby preparing a fired mixture; subjecting the fired mixture to pulverization or size classification; and introducing the fired mixture having been pulverized or size-classified into a rotary kiln and subjecting the same to secondary heat treatment, thereby forming a lithium nickel manganese cobalt-based positive electrode active material.

9 Claims, No Drawings

METHOD OF PREPARING POSITIVE ELECTRODE ACTIVE MATERIAL

CROSS-REFERENCE TO RELATED APPLICATIONS

The present application is a national phase entry under 35 U.S.C. § 371 of International Application No. PCT/KR2019/003269, filed on Mar. 20, 2019, which claims priority from Korean Patent Application No. 10-2018-0042892, filed on Apr. 12, 2018, the disclosures of which are incorporated herein by reference in their entirety.

TECHNICAL FIELD

The present invention relates to a method of preparing a positive electrode active material, and more particularly, to a method of preparing a lithium nickel manganese cobalt oxide-based positive electrode active material having excellent productivity, excellent quality consistency, and excellent physical properties.

BACKGROUND ART

Due to developments in technology and an increased demand for mobile devices, the demand for secondary batteries as an energy source is rapidly increasing, and among secondary batteries, lithium secondary batteries having a high energy density and a high action potential, a long cycle lifespan, and a low self-discharge rate have been commercialized and are widely used.

As a positive electrode active material for a lithium secondary battery, various lithium transition metal oxides such as $LiCoO_2$, $LiNiO_2$, $LiMnO_2$, $LiMn_2O_4$, $LiFePO_4$, $Li(Ni_aCo_bMn_c)O_2$ (here, a, b, and c are atomic fractions of oxide constituent elements and are independent of each other, wherein $0<a<1$, $0<b<1$, $0<c<1$, and $a+b+c=1$) and the like have been developed. Among these, $Li(Ni_aCo_bMn_c)O_2$ has been recently actively studied because it can be advantageously used in high-capacity and high-voltage applications.

The conventional lithium nickel manganese cobalt-based oxide is prepared by the method of mixing a precursor such as nickel manganese cobalt hydroxide with a lithium source material such as lithium hydroxide or lithium carbonate, introducing the mixture into a firing furnace, and firing the same at a high temperature of about 750-950° C.

Conventionally, a continuous firing furnace such as a roller hearth kiln has been used as the above-described firing furnace. A roller hearth kiln is a type of firing furnace in which a plurality of rollers are arranged at a predetermined interval and the rotation of the rollers in the same direction allows a material to be fired while being moved. While the roller hearth kiln provides the advantages of an excellent material flow therethrough and the easy removal of the moisture contained in a raw material, due to the randomly positioned heating wires and thermal conductivity variance in the firing furnace, which lead to a large temperature variance according to position, it also has drawbacks in that it results in a positive electrode active material with low quality consistency and, accordingly, increased costs due to increased production time for the purpose of improving the quality consistency of the positive electrode active material.

RELATED ART

Patent Document

Korean Laid-open Patent Application No. 2005-0083869

DISCLOSURE

Technical Problem

The present invention is directed to providing a method of preparing a positive electrode active material that can provide a lithium nickel manganese cobalt-based positive electrode active material having consistent and excellent quality.

Technical Solution

The present invention provides a method of preparing a positive electrode active material that includes the steps of: introducing a reaction mixture including a lithium source material and a nickel-manganese-cobalt precursor into a continuous firing furnace and subjecting the same to primary heat treatment, thereby preparing a fired mixture; subjecting the fired mixture to pulverization or size classification; and introducing the fired mixture having been pulverized or size-classified into a rotary kiln and subjecting the same to a secondary heat treatment, thereby forming a lithium nickel manganese cobalt-based positive electrode active material.

Advantageous Effects

In the method of preparing a positive electrode active material according to the present invention, the performance of two serial heat-treatment steps in a continuous firing furnace and a rotary kiln results in excellent quality consistency of particles and low cation mixing. Therefore, a lithium nickel manganese cobalt-based positive electrode active material having excellent electrochemical characteristics can be obtained.

In addition, the method of preparing a positive electrode active material according to the present invention allows unnecessary gases or moisture such as water or $CO_2$ to be released during the primary heat-treatment (firing) process performed in a continuous firing furnace, and accordingly, improves the flow of fired products during the secondary heat-treatment process. Therefore, the productivity of the positive electrode active material can be improved, and the production time can be shortened.

Furthermore, since the secondary heat treatment is performed in a rotary kiln, the heat can be transferred evenly to the raw material. Therefore, the physical property variance of the positive electrode active material can be reduced, and accordingly, the quality inconsistency of the positive electrode active material can be effectively resolved.

Modes of the Invention

Terms and words used in this specification and claims should not be interpreted as being limited to commonly used meanings or meanings in dictionaries, and based on the principle that the inventors can appropriately define concepts of terms in order to describe their invention in the best way, the terms and words should be interpreted with meanings and concepts which are consistent with the technological spirit of the present invention.

The terms used in the specification are used only to explain specific examples, not to limit the present invention. Singular expressions include plural referents unless clearly indicated otherwise in the context.

The terms "include," "have," and the like used herein designate the presence of characteristics, numbers, stages, components or combinations thereof, and it should be understood that the possibility of the presence or addition of one or more other characteristics, numbers, stages, components, or combinations thereof is not precluded.

"%" used herein indicates a weight percentage (wt %) unless explicitly indicated otherwise.

The present invention relates to a method of preparing a positive electrode active material, and more particularly, to a method of preparing a positive electrode active material that includes the steps of: (1) introducing a reaction mixture including a lithium source material and a nickel-manganese-cobalt precursor into a continuous firing furnace and subjecting the same to primary heat treatment, thereby preparing a fired mixture; (2) subjecting the fired mixture to pulverization or size classification; and (3) introducing the fired mixture having been pulverized or size-classified into a rotary kiln and subjecting the same to secondary heat treatment, thereby forming a lithium nickel manganese cobalt-based positive electrode active material.

Hereinafter, each step of the preparation method of the present invention will be described in more detail.

(1) Preparation of Fired Mixture

First, a reaction mixture including a lithium source material and a nickel-manganese-cobalt precursor is introduced into a continuous firing furnace.

As the lithium source material, various lithium source materials known in the art, for example, a lithium-containing carbonate (e.g., lithium carbonate or the like), a lithium-containing hydrate (e.g., lithium hydroxide monohydrate ($LiOH \cdot H_2O$) or the like), a lithium-containing hydroxide (e.g., lithium hydroxide or the like), a lithium-containing nitrate (e.g., lithium nitrate ($LiNO_3$) or the like), a lithium-containing chloride (e.g., lithium chloride (LiCl) or the like) or the like may be used without limitation. Preferably, as the lithium source material, one or more selected from the group consisting of lithium hydroxide and lithium carbonate may be used.

As the nickel-manganese-cobalt precursor, various nickel-manganese-cobalt precursor materials known in the art, for example, one or more selected from the group consisting of nickel manganese cobalt hydroxide, nickel manganese cobalt oxyhydroxide, nickel manganese cobalt carbonate, and nickel manganese cobalt organic complex may be used without limitation.

The nickel-manganese-cobalt precursor may be purchased among commercially available products, or may be prepared by a method of preparing a nickel-manganese-cobalt transition metal precursor well known in the art.

For example, the nickel-manganese-cobalt transition metal precursor may be prepared by subjecting a metal solution containing a nickel-containing raw material, a cobalt-containing raw material, and a manganese-containing raw material to a co-precipitation reaction by adding an ammonium-cation-containing complex-forming agent and a basic compound thereto.

For example, the nickel-containing raw material may be an acetate, nitrate, sulfate, halide, sulfide, hydroxide, oxide, oxyhydroxide, or the like that contains nickel, specifically, $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a mixture thereof, but the present invention is not limited thereto.

The cobalt-containing raw material may be an acetate, nitrate, sulfate, halide, sulfide, hydroxide, oxide, oxyhydroxide, or the like that contains cobalt, specifically, $Co(OH)_2$, CoOOH, $Co(OCOCH_3)_2 \cdot 4H_2O$, $Co(NO_3)_2 \cdot 6H_2O$, $Co(SO_4)_2 \cdot 7H_2O$, or a mixture thereof, but the present invention is not limited thereto.

For example, the manganese-containing raw material may be an acetate, nitrate, sulfate, halide, sulfide, hydroxide, oxide, or oxyhydroxide that contains manganese or a mixture thereof, specifically, a manganese oxide such as $Mn_2O_3$, $MnO_2$, or $Mn_3O_4$; a manganese salt such as $MnCO_3$, $Mn(NO_3)_2$, $MnSO_4$, manganese acetate, manganese dicarboxylate, manganese citrate, or a fatty acid manganese salt; manganese oxyhydroxide, manganese chloride, or a mixture thereof, but the present invention is not limited thereto.

The metal solution is prepared by adding the nickel-containing raw material, the cobalt-containing raw material, and the manganese-containing raw material to a solvent, wherein the solvent is specifically water or a mixture of water and an organic solvent (e.g., alcohol or the like) that can be uniformly mixed with water, or by mixing an aqueous solution of the nickel-containing raw material, an aqueous solution of the cobalt-containing raw material, and an aqueous solution of the manganese-containing raw material.

For example, the ammonium-cation-containing complex-forming agent may be $NH_4OH$, $(NH_4)_2SO_4$, $NH_4NO_3$, $NH_4Cl$, $CH_3COONH_4$, $(NH_4)_2CO_3$, or a mixture thereof, but the present invention is not limited thereto. The ammonium-cation-containing complex-forming agent may be used in the form of an aqueous solution containing, as the solvent, water or a mixture of water and an organic solvent (specifically, alcohol or the like) that can be uniformly mixed with water.

The basic compound may be a hydroxide of an alkali metal or alkaline earth metal, such as NaOH, KOH, or $Ca(OH)_2$, a hydrate thereof, or a mixture thereof. The basic compound may also be used in the form of an aqueous solution containing, as the solvent, water or a mixture of water and an organic solvent (specifically, alcohol or the like) that can be uniformly mixed with water.

The basic compound is used to adjust the pH of the reaction solution, and it may be used in an amount such that the metal solution has the pH of 10.5 to 13, preferably, 11 to 13.

Meanwhile, the co-precipitation reaction may be performed at a temperature of 40° C. to 70° C. under an inert atmosphere such as a nitrogen or argon atmosphere.

By the above-described process, nickel-manganese-cobalt-hydroxide particles are prepared and are precipitated in the reaction solution. The precipitated nickel-manganese-cobalt-hydroxide particles may be separated and dried by a conventional method, thereby preparing a transition metal precursor.

Meanwhile, the content of the lithium source material and the nickel-manganese-cobalt precursor in the reaction mixture may be appropriately adjusted in consideration of the composition of the final positive electrode active material to be obtained. For example, the lithium source material and the nickel-manganese-cobalt precursor may be included in the reaction mixture in an amount such that the lithium-to-transition metal atomic ratio is in the range of 1:1.00-1.09. Here, the above-described atomic ratio is based on the total number of transition metal atoms, that is, the sum of the number of nickel, cobalt, and manganese atoms.

Meanwhile, the reaction mixture may further include a doping source material for improving the stability and physical properties of the positive electrode active material in addition to the lithium source material and the nickel-manganese-cobalt precursor. As the doping source material, an oxide, hydroxide, sulfide, oxyhydroxide, or halide that contains one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, or a mixture thereof may be used.

The reaction mixture including the above-described components may be prepared by introducing the components into a mixer or the like and subjecting them to solid-phase mixing, but the present invention is not limited thereto.

The primary heat treatment is performed in a continuous firing furnace.

There is no particular limitation on the continuous firing furnace, and selection may be made from a tunnel kiln and a roller hearth kiln.

The tunnel kiln may be a tunnel-type firing furnace in which a reaction mixture is loaded on a transporting means such as a conveyor or the like and is fired as it is moved, and the roller hearth kiln may be a firing furnace in which a reaction mixture is fired as it passes over a roller conveyor of the firing furnace. As the tunnel kiln or the roller hearth kiln, any tunnel kiln or roller hearth kiln being commonly used in the art may be used without limitation.

Between the tunnel kiln and the roller hearth kiln, the roller hearth kiln is preferred as the continuous firing furnace in terms of exhibiting excellent thermal efficiency.

Specifically, the roller hearth kiln may be a type of firing furnace in which a plurality of rollers are arranged at a predetermined interval and the rotation of the rollers in the same direction allows a material to be fired while being moved.

In addition, the roller hearth kiln may have a direct or indirect exhaust passage, and accordingly, the oxygen partial pressure or the like therein can be controlled.

The primary heat treatment allows the lithium source material and the nickel-manganese-cobalt precursor to react with each other, resulting in the formation of a fired mixture, which is a mixture of spinel-structured lithium nickel cobalt manganese-based oxide seeds and laminar-structured lithium nickel cobalt manganese-based oxide seeds. The following Reaction Scheme 1 illustrates the reaction that takes place during the primary heat treatment performed using LiOH as the lithium source material and nickel manganese cobalt hydroxide as the nickel-manganese-cobalt precursor.

$$LiOH+[Ni_aMn_bCo_c](OH)_2 \rightarrow Li[Ni_aMn_bCo_c]_2O_4,$$
$$Li[Ni_aMn_bCo_c]O_2 \qquad \text{[Reaction Scheme 1]}$$

Since the reaction between the lithium source material and the nickel-manganese-cobalt precursor involves the melting of the lithium source material, which has a low density, the fired mixture formed therefrom may have a smaller volume than the reaction mixture.

In the roller hearth kiln, since the heat is transferred to the reaction mixture through the above-mentioned roller conveyor, excellent heat conduction or heat transfer efficiency is exhibited, and accordingly, a fired mixture which is a mixture of spinel-structured lithium nickel cobalt manganese-based oxide seeds and laminar-structured lithium nickel cobalt manganese-based oxide seeds can be easily prepared. In addition, since the roller hearth kiln allows the smooth supply and smooth exhaustion of air thereto and therefrom, unnecessary by-products such as moisture, $CO_2$, and the like can be effectively removed, which is favorable for the density increase and volume reduction of the fired mixture, and accordingly, the room- or high-temperature flow of the fired mixture in the secondary heat treatment to be described below can be improved, which is favorable for productivity enhancement.

The primary heat treatment may be performed in a temperature range of 300° C. to 900° C., preferably 500° C. to 850° C., and more preferably 600° C. to 800° C. When the primary heat treatment is performed within the above-described temperature range, the crystal of the nickel-manganese-cobalt precursor can be grown at an appropriate rate, which is advantageous for controlling characteristics of the active material, and the effects produced by the primary heat treatment are favorable for the volume reduction and flow improvement of the fire mixture.

The primary heat treatment may be performed for 3 hours to 15 hours, and preferably 5 hours to 12 hours. Satisfaction of the above-described range is favorable for the sufficient removal of moisture and gases generated during the heat treatment and the easy control of crystal growth during the secondary heat treatment.

In addition, the primary heat treatment may be performed under an oxygen atmosphere or an air atmosphere. As described above, the performance of firing at a primary heat-treatment temperature results in the formation of a spinel-structured lithium nickel cobalt manganese-based oxide. Since the formation of the spinel structure is an oxidation process as described in Reaction Scheme 1, the crystal size is increased and the cation mixing is reduced under the condition of high oxygen partial pressure. Therefore, it is preferable that the primary heat treatment be performed under an oxygen atmosphere or an air atmosphere, where the oxygen partial pressure is high.

(2) Pulverization or Size Classification

Once the fired mixture is prepared through the primary heat treatment, the prepared fired mixture is collected from the continuous firing furnace and then subjected to pulverization or size classification.

The pulverization or size classification may be carried out by a conventional pulverization or size-classification method known in the art, for example, by ball milling, jet milling, sieving, or the like.

The pulverization or size classification increases the tapped density of the fired mixture and effectively removes impurities such as moisture and carbon dioxide, thereby reducing the volume of the fired mixture. Since a larger amount of the fired mixture can be accommodated in the rotary kiln for the secondary heat treatment, the productivity can be improved.

In addition, the fired mixture is homogeneously compounded during the pulverization or size-classification process, and thus the quality consistency of the positive electrode active material can be improved.

(3) Formation of Lithium Nickel Manganese Cobalt-Based Positive Electrode Active Material Once the pulverization or size-classification process is completed, the fired mixture having been pulverized or size-classified is introduced into a rotary kiln and subjected to secondary heat treatment, thereby forming a lithium nickel manganese cobalt-based positive electrode active material.

In the method of preparing a positive electrode active material according to the present invention, the secondary heat treatment is performed in a rotary kiln.

As the rotary kiln, any rotary kiln known in the art may be used without limitation.

Since the secondary heat treatment is performed in a rotary kiln in which the rotation of a rotary cylindrical tube allows the heat to be evenly transferred to the raw materials, the contact between input gas and the raw materials to be more uniform, and the raw materials to be continuously mixed, the consistency in the physical properties or characteristics of the lithium nickel manganese cobalt-based positive electrode active material can be improved.

When a positive electrode active material is prepared by a single process using a continuous firing furnace, e.g., a roller hearth kiln, the internal temperature variance of the firing furnace may intensify the quality variance of the positive electrode active material being prepared, and accordingly, it is necessary to perform long-term firing to overcome the problem. On the other hand, the present invention provides a secondary heat-treatment process using a rotary kiln and thereby enables the preparation of a positive electrode active material with improved quality consistency in a relatively short time.

When a positive electrode active material is prepared by a single process using a rotary kiln, the reaction mixture holds moisture therein and thus may agglomerate, possibly causing an inlet or outlet of the firing furnace to be clogged. On the other hand, in the present invention, such a process is preceded by a primary heat-treatment process using a roller hearth kiln, and therefore by-products such as moisture can be removed in advance, and the flow of the fired mixture can be remarkably improved. As a result, the productivity of the positive electrode active material can be improved, the consistency in physical properties can be realized, the production time can be shortened, and the productivity can be improved.

The rotary kiln may include a rotary cylindrical tube having an inlet portion and an outlet portion. The fired mixture introduced through the inlet portion is mixed and fired in the rotary cylindrical tube being rotated, and the product is discharged through the outlet portion.

The rotary kiln may include a heating portion configured to surround at least a part of the rotary cylindrical tube. The operation of the heating portion may cause the heat to be transferred to the interior of the rotary cylindrical tube. Accordingly, the fired mixture is subjected to secondary heat treatment, thereby preparing a lithium nickel manganese cobalt-based positive electrode active material, which is discharged through the outlet portion.

The rotary kiln may further include a direct or indirect exhaust passage, and accordingly, the oxygen partial pressure or the like therein can be controlled.

In pursuit of the smooth compounding and smooth firing of the fired mixture and the easy discharge of the positive electrode active material, the rotary cylindrical tube of the rotary kiln may be disposed such that the outlet portion is provided closer to the ground than the inlet portion. The rotary cylindrical tube may be disposed such that it is inclined at an angle of 2° to 8°, preferably, 3° to 6°, and the outlet portion is not level with the inlet portion.

There is no particular limitation on the diameter and length of the rotary cylindrical tube, and selection may be made appropriately in consideration of the type, amount, and the like of the raw materials to be introduced. Specifically, the rotary cylindrical tube may have a length-to-diameter ratio of 2 to 20, and preferably 5 to 15. The rotary cylindrical tube may have a diameter of 0.1 m to 50 m, and preferably 0.3 m to 20 m, and a length of 2 m to 100 m, and preferably 2.5 m to 50 m.

There is no particular limitation on the rate at which the rotary cylindrical tube is rotated during the secondary heat treatment. Specifically, the rotary cylindrical tube may be rotated at a rate of 0.5 rpm to 8 rpm, and preferably 1 rpm to 5 rpm, such that smooth compounding of the fired mixture and uniform heat transfer to the fired mixture can be realized.

The rotary cylindrical tube may include at least one selected from the group consisting of quartz, alumina, and stainless steel, and preferably includes quartz. The use of quartz as the material of the rotary cylindrical tube offers relatively high convenience in maintenance and repair, and since quartz has low activity with lithium and the like, can eliminate the risk of the tube reacting with lithium and the like and absorbing the same during firing.

Upon the secondary heat treatment, the spinel-structured lithium nickel manganese cobalt oxide in the fired mixture is converted into a laminar type through the reaction shown in the following Reaction Scheme 2, and the laminar-structured lithium nickel manganese cobalt oxide seeds can grow into crystals.

$$Li[Ni_aMn_bCo_c]_2O_4 + \tfrac{1}{2}Li_2O \rightarrow Li[Ni_aMn_bCo_c]O_2 \quad [\text{Reaction Scheme 2}]$$

Since the formation of the laminar-structured lithium nickel manganese cobalt oxide is a reduction reaction as shown above in Reaction Scheme 2, the condition of low oxygen partial pressure may be favorable for the formation of the structure. Specifically, the performance of the secondary heat treatment at a low oxygen partial pressure may result in an increase in crystal size and the reduction of cation mixing. Specifically, the secondary heat treatment, which results in the formation of the laminar structure, may be performed under the condition in which oxygen partial pressure is no more than 20%, and more specifically, the secondary heat treatment may be performed under a nitrogen atmosphere or a vacuum atmosphere. Accordingly, a positive electrode active material having excellent physical properties and excellent electrochemical properties can be prepared.

Generally, the process of firing a lithium source material and a nickel-manganese-cobalt precursor involves the generation of a gas such as $CO_2$ or the like, and the generation of unnecessary gases such as $CO_2$ results in the reduction of oxygen partial pressure in the firing atmosphere, and accordingly, the degradation of physical properties of the positive electrode active material being prepared. Therefore, until now, it has been common to carry out the firing process under an oxygen atmosphere in order to prepare a high-quality positive electrode active material. However, in the case of the present invention, since $CO_2$ gas has already been generated in the primary heat treatment, the secondary heat-treatment process does not generate by-products such as $CO_2$. Therefore, even the secondary heat treatment performed in a low oxygen partial pressure atmosphere can prepare a positive electrode active material of excellent quality.

The secondary heat treatment may be performed for 1 hour to 7 hours, and preferably 2 hours to 5 hours. Satisfaction of the above-described range is favorable for sufficient crystal growth and the improvement in the high-temperature lifetime and storage property of the active material.

The secondary heat treatment may be performed in the temperature range of 600° C. to 1,000° C., and preferably 700° C. to 900° C., such that the consistency in physical properties of the positive electrode active material can be improved or the above-described laminar-structured lithium-nickel-manganese-cobalt-oxide crystal growth can be easily realized.

Meanwhile, although not essential in the preparation method of the present invention, a doping source material may be further added to the rotary kiln before the secondary heat treatment, if necessary, in order to improve the stability and physical properties of the positive electrode active material. As the doping source material, an oxide, hydroxide, sulfide, oxyhydroxide, or halide that includes one or more elements selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo, or a mixture thereof may be used.

The lithium nickel manganese cobalt-based positive electrode active material prepared by the above-described preparation method of the present invention may be represented by the following Chemical Formula 1.

$$Li_{1+x}[Ni_aMn_bCo_cM^1_{1-a-b-c}]_{1-x}O_2 \quad \text{[Chemical Formula 1]}$$

In Chemical Formula 1, $-0.2 \leq x \leq 0.2$, $0 < a < 1$, $0 < b < 1$, $0 < c < 1$, and $M^1$ is one or more selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

Here, a, b, and c are atomic fractions of Ni, Mn, and Co, respectively, wherein, for example, $0.01 \leq a \leq 0.98$, $0.01 \leq b \leq 0.98$, and $0.01 \leq c \leq 0.98$, specifically, $0.5 \leq a \leq 0.98$, $0.01 \leq b \leq 0.49$, and $0.01 \leq c \leq 0.49$, and more specifically, $0.6 \leq a \leq 0.98$, $0.01 \leq b \leq 0.39$, and $0.01 \leq c \leq 0.39$, but the present invention is not limited thereto.

Due to the primary heat treatment using a continuous firing furnace, the method of preparing a positive electrode active material according to the present invention can be used to prepare a fired mixture having a reduced volume, an increased density, and an improved flow. In addition, since the moisture in the reaction mixture or the by-products such as $CO_2$ are effectively removed by the primary heat treatment, when the prepared fired mixture is introduced into a rotary kiln and subjected to secondary heat treatment, the occurrence of fired mixture agglomeration due to moisture is significantly reduced, and accordingly, it can be expected that the production time of the positive electrode active material will be shortened or the production amount thereof will be increased. In addition, the degradation of a firing atmosphere or of properties of the positive electrode active material, which may be caused by reaction by-products during secondary heat treatment using a rotary kiln, can be minimized, and accordingly, a positive electrode active material of excellent and consistent quality can be prepared.

Hereinafter, the present invention will be described in more detail with reference to specific exemplary embodiments.

EXAMPLE 1

LiOH and $Ni_{0.8}Co_{0.1}Mn_{0.1}(OH)_2$ were mixed in a mixer such that the lithium-to-transition metal atomic ratio was 1.01:1, thereby preparing a reaction mixture. 7,500 g (volume: 4,000 ml) of the reaction mixture was introduced into a roller hearth kiln (with a closeable entrance and exit, internal volume: 1000 $m^3$, roller speed: 9 mm/min, oxygen feed rate: 650 $m^3$/min) and subjected to primary heat treatment for 10 hours at 650° C. under an oxygen atmosphere, thereby preparing a fired mixture, which was then cooled. The prepared fired mixture had a volume of 1,800 ml and a weight of about 5,000 g.

The fired mixture weighing 5,000 g (volume: 1,800 ml) was subjected to crushing and sieving, and the crushed fired mixture was introduced into a rotary kiln (quartz tube, diameter: 0.3 m, length: 3 m, rotational speed: 2 rpm, raw material feed rate: 2,000 g/h, inclination: 5°) and subjected to secondary heat treatment for three hours at 760° C. under a nitrogen atmosphere, thereby preparing the positive electrode active material of Example 1 (weight: 5,000 g, volume: 1,800 ml).

EXAMPLE 2

$Li_2CO_3$ and $Ni_{0.6}Co_{0.2}Mn_{0.2}(OH)_2$ were mixed in a mixer such that the lithium-to-transition metal atomic ratio was 1.07:1, thereby preparing a reaction mixture. 7,500 g (volume: 4,000 ml) of the reaction mixture was introduced into the same roller hearth kiln as in Example 1 and subjected to primary heat treatment for 10 hours at 750° C. under an oxygen atmosphere, thereby preparing a fired mixture, which was then cooled. The prepared fired mixture had a volume of 1,800 ml and a weight of about 5,000 g.

The fired mixture weighing 5,000 g (volume: 1,800 ml) was subjected to crushing and sieving, and the crushed fired mixture was introduced into the same rotary kiln as in Example 1 and subjected to secondary heat treatment for three hours at 820° C. under a nitrogen atmosphere, thereby preparing the positive electrode active material of Example 2 (weight: 5,000 g, volume: 1,800 ml).

COMPARATIVE EXAMPLE 1

LiOH and $Ni_{0.8}Co_{0.1}Mn_{0.1}(OH)_2$ were mixed in a mixer such that the lithium-to-transition metal atomic ratio was 1.01:1, thereby preparing a reaction mixture. 7,500 g (volume: 4,000 ml) of the reaction mixture was introduced into the same roller hearth kiln as in Example 1 and subjected to a 13-hour heat treatment at 650° C. under an oxygen atmosphere, cooling, crushing, and sieving, thereby preparing the positive electrode active material of Comparative Example 1 (weight: 5,000 g, volume: 1,700 ml).

COMPARATIVE EXAMPLE 2

LiOH and $Ni_{0.8}Co_{0.1}Mn_{0.1}(OH)_2$ were mixed in a mixer such that the lithium-to-transition metal atomic ratio was 1.01:1, thereby preparing a reaction mixture. 7,500 g (volume: 4,000 ml) of the reaction mixture was introduced into the same rotary kiln as in Example 1 and subjected to a 13-hour heat treatment at 650° C. under an oxygen atmosphere, cooling, crushing, and sieving, thereby preparing the positive electrode active material of Comparative Example 2. The positive electrode active material prepared by the above-describe process had a weight of 500 g and a volume of 180 ml. In Comparative Example 2, the weight of the prepared positive electrode active material was significantly lower than the weight of the introduced reaction mixture, which is considered to be due to the clogging of the inlet due to the agglomeration of the reaction mixture caused by the moisture contained in LiOH and the like.

EXPERIMENTAL EXAMPLE 1: DETERMINATION OF CRYSTAL SIZE AND CATION MIXING IN POSITIVE ELECTRODE ACTIVE MATERIAL

The crystal size and cation mixing of the positive electrode active materials prepared in Examples 1 and 2 and Comparative Examples 1 and 2 were determined by XRD refinement analysis, results of which are shown in the following Table 1. Cation mixing is a phenomenon in which some $Ni^{2+}$ ions switch positions with some $Li^+$ ions due to the similarity in ionic sizes thereof, resulting in the presence of Ni atoms in the Li layer rather than in the transition metal layer where they normally belong. A lower cation mixing ratio can be considered to indicate more successful synthesis of a positive electrode active material.

TABLE 1

|  | Crystal size (nm) | Cation mixing ratio (%) |
|---|---|---|
| Example 1 | 135.2 | 1.12 |
| Example 2 | 120.4 | 1.03 |
| Comparative Example 1 | 110.2 | 2.68 |
| Comparative Example 2 | 84.3 | 15.63 |

Referring to Table 1, the positive electrode active materials of Examples 1 and 2, which were prepared by performing primary and secondary heat-treatment processes in series in a continuous firing furnace and a rotary kiln, were evaluated to have a larger crystal size and a lower cation mixing ratio than those of the comparative examples.

On the other hand, in the case of Comparative Example 1, where only a roller hearth kiln was used, a higher cation mixing ratio, and accordingly, large quality inconsistency were exhibited despite the same duration of heat treatment as in the examples. Likewise, in the case of Comparative Example 2, where only a rotary kiln was used, it was evaluated that the cation mixing ratio was very high because the occurrence of agglomeration hindered sufficient firing of the mixture.

EXPERIMENTAL EXAMPLE 2: EVALUATION OF LIFETIME CHARACTERISTICS AND DIRECT CURRENT RESISTANCE INCREASE RATE

Each one of the positive electrode active materials prepared according to Examples 1 and 2 and Comparative Examples 1 and 2 was dispersed, along with a PVdF binder and carbon black at a weight ratio of 97.5:1.5:1.0, in an NMP solution to prepare a slurry. The slurry was then applied on an Al current collector and later rolled by a roll press, thereby producing a positive electrode.

Meanwhile, a natural graphite negative electrode active material, a carbon black conductive material, and a PVdF binder, at a weight ratio of 95.6:1.0:3.4, were mixed in an N-methylpyrrolidone solvent to prepare a composition for forming a negative electrode, which was then applied on a Cu current collector, thereby producing a negative electrode.

A porous polyethylene separator was interposed between the positive electrode and the negative electrode produced as described above, thereby producing an electrode assembly. After the electrode assembly was placed in a case, a liquid electrolyte was injected into the case, thereby manufacturing a coin cell lithium secondary battery. Here, the liquid electrolyte was prepared by dissolving lithium hexafluorophosphate (LiPF$_6$) at a concentration of 0.7 M in an organic solvent composed of ethylene carbonate (EC) and ethyl methyl carbonate (EMC) (EC-to-EMC volumetric mixing ratio=3:7).

The coin cell prepared as described above was subjected to two cycles of charging and discharging at room temperature under the conditions of an end-of-charge voltage of 4.25 V, an end-of-discharge voltage of 2.5 V, and a rate of 0.1 C/0.1 C, and then the initial charge-discharge capacity and initial resistance were determined. Afterwards, the capacity retention rate (in %) and direct current resistance (DCR) increase rate (in %) after 50 cycles were measured while subjecting the coin cell to charging and discharging at 45° C. under the conditions of an end-of-charge voltage of 4.25 V, an end-of-discharge voltage of 2.5 V, and a rate of 0.3 C/0.3 C. The measurement results are shown in Table 2.

TABLE 2

| Classification | Initial charge/discharge capacity (mA/g) | Initial resistance (Ω) | Capacity retention rate after 50 cycles (%) | DCR increase rate after 50 cycles (%) |
|---|---|---|---|---|
| Example 1 | 227.6/206.3 | 13.6 | 95.6 | 158 |
| Example 2 | 195.7/180.5 | 14.4 | 97.7 | 146 |
| Comparative Example 1 | 227.6/206.3 | 16.2 | 93.4 | 236 |
| Comparative Example 2 | 185.2/143.5 | 31.5 | 42.5 | 573 |

Referring to Table 2, the positive electrode active materials of Examples 1 and 2 prepared by performing primary and secondary heat-treatment processes in series in a continuous firing furnace and a rotary kiln were evaluated to exhibit excellent capacity retention, low resistance, and a low DCR increase rate compared to those of Comparative Example 1 where only a roller hearth kiln was used and Comparative Example 2 where only a rotary kiln was used.

EXPERIMENTAL EXAMPLE 3: MEASUREMENT OF AMOUNT OF RESIDUAL LITHIUM IN PREPARED POSITIVE ELECTRODE ACTIVE MATERIAL

The amount of residual lithium in the positive electrode active materials of Examples 1 and 2 and Comparative Examples 1 and 2 was measured using an 888 Titrando instrument manufactured by Metrohm AG, by the Warder titration method in which the amount of OH$^-$ ions and CO$_3^{2-}$ ions is determined by titration. The ratio (in mol %) of the number of moles of unreacted residual lithium to the total number of moles of lithium introduced in preparation of the positive electrode active materials determined by the above-described method is shown in the following Table 3.

TABLE 3

| Classification | Li$_2$CO$_3$ (mol %) | LiOH (mol %) | Total (mol %) |
|---|---|---|---|
| Example 1 | 0.343 | 0.481 | 0.824 |
| Example 2 | 0.629 | 0.356 | 0.985 |
| Comparative Example 1 | 0.493 | 0.605 | 1.098 |
| Comparative Example 2 | 1.158 | 1.323 | 2.481 |

Referring to Table 3, it can be seen that the amount of residual lithium was significantly low in the positive electrode active materials of Examples 1 and 2 prepared by performing primary and secondary heat-treatment processes in series in a continuous firing furnace and a rotary kiln as compared with the comparative examples.

On the other hand, in the case of Comparative Example 1 where only a roller hearth kiln was used and Comparative Example 2 where only a rotary kiln was used, it was evaluated that the amount of unreacted residual lithium was large because sufficient firing could not be achieved despite the same duration of heat treatment as in the examples.

The invention claimed is:

1. A method of preparing a positive electrode active material comprising:

introducing a reaction mixture including a lithium source material and a nickel-manganese-cobalt precursor into a continuous firing furnace and performing primary heat treatment, thereby preparing a fired mixture;

subjecting the fired mixture to pulverization or size classification; and introducing the fired mixture having been pulverized or size-classified into a rotary kiln and performing secondary heat treatment, thereby forming a lithium nickel manganese cobalt-based positive electrode active material, wherein the continuous firing furnace is a roller hearth kiln;

wherein the fired mixture is a mixture of spinel structured lithium nickel cobalt manganese-based oxide seeds and laminar-structured lithium nickel cobalt manganese-based oxide seeds, wherein the primary heat treatment is performed under an oxygen atmosphere or an air atom sphere, and wherein the secondary heat treatment is performed under an inert nitrogen atmosphere or a vacuum atmosphere;

wherein the lithium nickel manganese cobalt-based positive electrode active material is represented by the following Chemical Formula 1:

$$Li_{1+x}[Ni_aMn_bCo_cM^1_{1-a-b-c}]_{1-x}O_2 \qquad \text{[Chemical Formula 1]}$$

wherein, in Chemical Formula 1, $-0.2 \leq x \leq 0.2$, $0 < a < 1$, $0 < b < 1$, $0 < c < 1$, and $M^1$ is one or more selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

2. The method of claim 1, wherein the rotary kiln includes a rotary cylindrical tube having an inlet portion and an outlet portion, wherein the rotary cylindrical tube is disposed such that it is inclined at an angle of 2° to 8° and the outlet portion is not level with the inlet portion.

3. The method of claim 2, wherein the rotary cylindrical tube is rotated at a rate of 0.5 rpm to 8 rpm during the secondary heat treatment.

4. The method of claim 2, wherein the rotary cylindrical tube has the length-to-diameter ratio of 2 to 20.

5. The method of claim 1, wherein the primary heat treatment is performed in a temperature range of 300° C. to 900° C.

6. The method of claim 1, wherein the secondary heat treatment is performed in a temperature range of 600° C. to 1,000° C.

7. The method of claim 1, wherein the secondary heat treatment is performed under an atmosphere in which oxygen partial pressure is no more than 20%.

8. The method of claim 1, wherein the primary heat treatment is performed for 3 hours to 15 hours.

9. The method of claim 1, wherein the secondary heat treatment is performed for 1 hour to 7 hours.

* * * * *